(12) United States Patent
Dylewski, II et al.

(10) Patent No.: US 11,707,974 B2
(45) Date of Patent: *Jul. 25, 2023

(54) TONNEAU COVER TIE-DOWN ASSEMBLY

(71) Applicant: Truck Accessories Group, LLC, Elkhart, IN (US)

(72) Inventors: Eugene A. Dylewski, II, Granger, IN (US); Christopher David Mattison, Granger, IN (US); John William Bevis, III, Mishawaka, IN (US)

(73) Assignee: Leer Group, Elkhart, IN (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/371,402

(22) Filed: Jul. 9, 2021

(65) Prior Publication Data

US 2021/0402857 A1 Dec. 30, 2021

Related U.S. Application Data

(63) Continuation of application No. 16/593,049, filed on Oct. 4, 2019, now Pat. No. 11,059,359.

(60) Provisional application No. 62/743,168, filed on Oct. 9, 2018.

(51) Int. Cl.
*B60J 7/19* (2006.01)
*B60J 7/14* (2006.01)
*B62D 33/023* (2006.01)

(52) U.S. Cl.
CPC ............... *B60J 7/198* (2013.01); *B60J 7/141* (2013.01); *B62D 33/023* (2013.01)

(58) Field of Classification Search
CPC ......... B62D 33/023; B60J 7/198; B60J 7/141; B60P 7/0807; B60P 7/0815
See application file for complete search history.

(56) References Cited

U.S. PATENT DOCUMENTS

| | | | |
|---|---|---|---|
| 5,636,893 A | 6/1997 | Wheatly et al. | |
| 7,188,888 B2* | 3/2007 | Wheatley | B60J 7/141 |
| | | | 292/256.73 |
| 7,334,830 B2* | 2/2008 | Weldy | B60J 7/198 |
| | | | 296/100.09 |
| 9,533,555 B2* | 1/2017 | Facchinello | B60J 7/106 |
| 9,862,257 B1* | 1/2018 | Kozlowski | B60J 7/198 |
| 10,144,276 B2* | 12/2018 | Facchinello | B60J 7/141 |
| 11,059,359 B2* | 7/2021 | Dylewski, II | B60J 7/198 |
| 11,299,021 B2* | 4/2022 | Dylewski, II | B60J 7/1607 |
| 11,446,995 B2* | 9/2022 | Dylewski, II | B60J 7/198 |
| 2006/0177283 A1* | 8/2006 | Terry | B60P 7/0807 |
| | | | 410/106 |
| 2012/0251261 A1 | 10/2012 | Liu et al. | |

(Continued)

OTHER PUBLICATIONS

Extended European Search Report 19871236.6-1009 / PCT/US2019/054920; dated May 27, 2022.

(Continued)

*Primary Examiner* — Gregory A Blankenship
(74) *Attorney, Agent, or Firm* — Barnes & Thornburg LLP

(57) ABSTRACT

A tonneau cover assembly located over the cargo bed of a truck is provided. The tonneau cover assembly includes a base panel that extends over the cargo bed of the truck. The tonneau cover also includes at least one cover section that selectively shrouds the cargo bed and is located adjacent the base panel. The tonneau cover assembly includes either one or both a tie-down block assembly and/or a tether assembly.

16 Claims, 11 Drawing Sheets

(56) References Cited

U.S. PATENT DOCUMENTS

| | | |
|---|---|---|
| 2012/0274092 A1 | 11/2012 | Yue |
| 2014/0042754 A1 | 2/2014 | Spencer |
| 2017/0259655 A1* | 9/2017 | Dylewski, II ............ B60J 7/141 |
| 2020/0108702 A1* | 4/2020 | Dylweski, II ............ B60J 7/198 |
| 2020/0331329 A1* | 10/2020 | Schmeichel ............ B60J 7/198 |
| 2021/0016646 A1* | 1/2021 | Dylewski, II ............ B60J 7/141 |
| 2021/0402857 A1* | 12/2021 | Dylewski, II ............ B60J 7/198 |

OTHER PUBLICATIONS

Extang Corporation—Extang Installation Sheet—Encore Tonno; 10 pages; Extang.com; Dated 2016.

* cited by examiner

TONNEAU COVER TIE-DOWN ASSEMBLY

RELATED APPLICATIONS

The present application is a Continuation of application Ser. No. 16/593,049, filed on Oct. 4, 2019, entitled "Tonneau Cover Tie-Down Assembly" and claims priority to U.S. Provisional Patent Application, Ser. No. 62/743,168, filed on Oct. 9, 2018, entitled "Tonneau Cover Tie-Down Assembly." The subject matter disclosed in those applications are hereby expressly incorporated into the present Application by reference.

TECHNICAL FIELD AND SUMMARY

The present disclosure relates to trucks such as pickup trucks and like vehicles. In particular, the present disclosure relates to a pickup truck bed cover, also known as a tonneau cover that includes a tie-down assembly to secure the tonneau cover to the truck.

Tonneau or pickup truck bed covers provide a covering for a pickup truck bed when used in combination with the truck's sidewalls and tailgate. Supported by the bed's sidewalls and suspended over the pickup truck bed, the tonneau cover helps create a secure compartment where items may be stored in the bed out of view when the tailgate is up.

An illustrative embodiment of the present disclosure is directed to a tonneau cover assembly located over a cargo bed of a truck. The cargo bed is located adjacent a cab section of the truck and is bounded by a first wall and a second wall spaced apart from the first wall. The tonneau cover assembly comprises a base panel that extends over the cargo bed of the truck. At least one cover section selectively shrouds the cargo bed and is located adjacent the base panel. At least one rail is located adjacent a first wall of the cargo bed. A bracket is located on the rail. A tie-down block assembly that includes: a block having a first surface and an arm that extends from the block and is spaced apart from the first surface; the arm includes a second surface; the first surface is spaced apart from the second surface; and a bolt that includes a bolthead and a shaft extending from the bolthead, wherein the bolthead is wider than a diameter of the shaft. The bolthead of the bolt is fitted in an opening in the base panel; the shaft of the bolt is disposed in the block; the first surface of the block abuts a surface of the base panel; and the second surface of the arm that extends from the block abuts the bracket located on the rail. A tether assembly that includes: a hook that is selectively engageable with the bracket located on the rail; a bracket attached to the at least one cover section; and a strap that is attached to the hook and the bracket.

In the above and other embodiments, the tonneau cover assembly may further comprise: the bracket including first and second openings wherein the first opening receives a portion of the arm and the second opening receives a portion of the hook; a threaded knob that engages threads on the shaft of the bolt and engages the block of the tie-down block assembly to press the first surface of the block against the surface of the base panel; the shaft of the bolt is disposed through the block; the surface of the base panel is an underside surface; and the strap being made of a flexible material.

Another illustrative embodiment of the present disclosure is directed to a tonneau cover assembly located over a cargo bed of a truck. The cargo bed is located adjacent a cab section of the truck and is bounded by a first wall and a second wall spaced apart from the first wall. The tonneau cover assembly comprises a base panel that extends over the cargo bed of the truck. At least one cover section selectively shrouds the cargo bed and is located adjacent the base panel. At least one rail is located adjacent a first wall of the cargo bed. A bracket is located on the rail. A tie-down block assembly that includes: a block having a first surface and an arm that extends from the block and is spaced apart from the first surface; the arm includes a second surface; the first surface is spaced apart from the second surface; and a bolt that includes a bolthead and a shaft extending from the bolthead, wherein the bolthead is wider than a diameter of the shaft. The bolthead of the bolt is fitted in an opening in the base panel; the shaft of the bolt is disposed in the block; the first surface of the block abuts a surface of the base panel; and the second surface of the arm that extends from the block abuts the bracket located on the rail.

Another illustrative embodiment of the present disclosure is directed to a tonneau cover assembly located over a cargo bed of a truck. The cargo bed is located adjacent a cab section of the truck and is bounded by a first wall and a second wall spaced apart from the first wall. The tonneau cover assembly comprises a base panel that extends over the cargo bed of the truck. At least one cover section selectively shrouds the cargo bed and is located adjacent the base panel. At least one rail is located adjacent a first wall of the cargo bed. A bracket is located on the rail. A tether assembly, which includes: a hook that is selectively engageable with the bracket located on the rail; a bracket attached to the at least one cover section; and a strap that is attached to the hook and the bracket.

Another illustrative embodiment of the present disclosure is directed to a tonneau cover assembly located over a cargo bed of a truck. The cargo bed is located adjacent a cab section of the truck and is bounded by a first wall and a second wall spaced apart from the first wall. The tonneau cover assembly comprises a base panel that extends over the cargo bed of the truck. At least one cover section selectively shrouds the cargo bed and is located adjacent the base panel. At least one rail is located adjacent a first wall of the cargo bed. A bracket is located on the rail. A tie-down assembly, which includes: a head that engages the base panel; a first surface that is spaced apart from the head that engages a bottom surface of the base panel; and a second surface that is spaced apart from the first surface and the head. The second surface engages the bracket located on the rail.

In the above and other embodiments, the tonneau cover assembly may further comprise: the head fits into a slot formed in the bottom surface of the base panel; the bottom surface of the base panel being located between the head and the first surface of the tie-down assembly; the head of the tie-down assembly fits into a slot formed in the bottom surface of the base panel and the second surface of the tie-down assembly engages the bracket on the rail such that at least a portion of the bottom surface of the base panel and at least a portion of the rail is located between the head and the second surface.

Another illustrative embodiment of the present disclosure is directed to a tonneau cover assembly located over a cargo bed of a truck. The cargo bed is located adjacent a cab section of the truck and is bounded by a first wall and a second wall spaced apart from the first wall. The tonneau cover assembly comprises a base panel that extends over the cargo bed of the truck. At least one cover section selectively shrouds the cargo bed and is located adjacent the base panel. At least one rail is located adjacent a first wall of the cargo bed. A bracket is located on the rail. A tether assembly, which includes a longitudinally extending strap that extends from the rail to the at least one cover section.

In the above and other embodiments, the tonneau cover assembly may further comprise: a hook attached to a first end of the strap, wherein the hook engages the bracket on the rail; a bracket that is attached to the at least one cover section and attached to a second end of the strap; the longitudinally extending strap has a length that creates slack between the rail and the at least one cover section; and the longitudinally extending strap being made of a flexible material.

Additional features and advantages of the tonneau cover tie-down assembly will become apparent to those skilled in the art upon consideration of the following detailed descriptions of carrying out the tonneau cover tie-down assembly as presently perceived.

BRIEF DESCRIPTION OF DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1A:
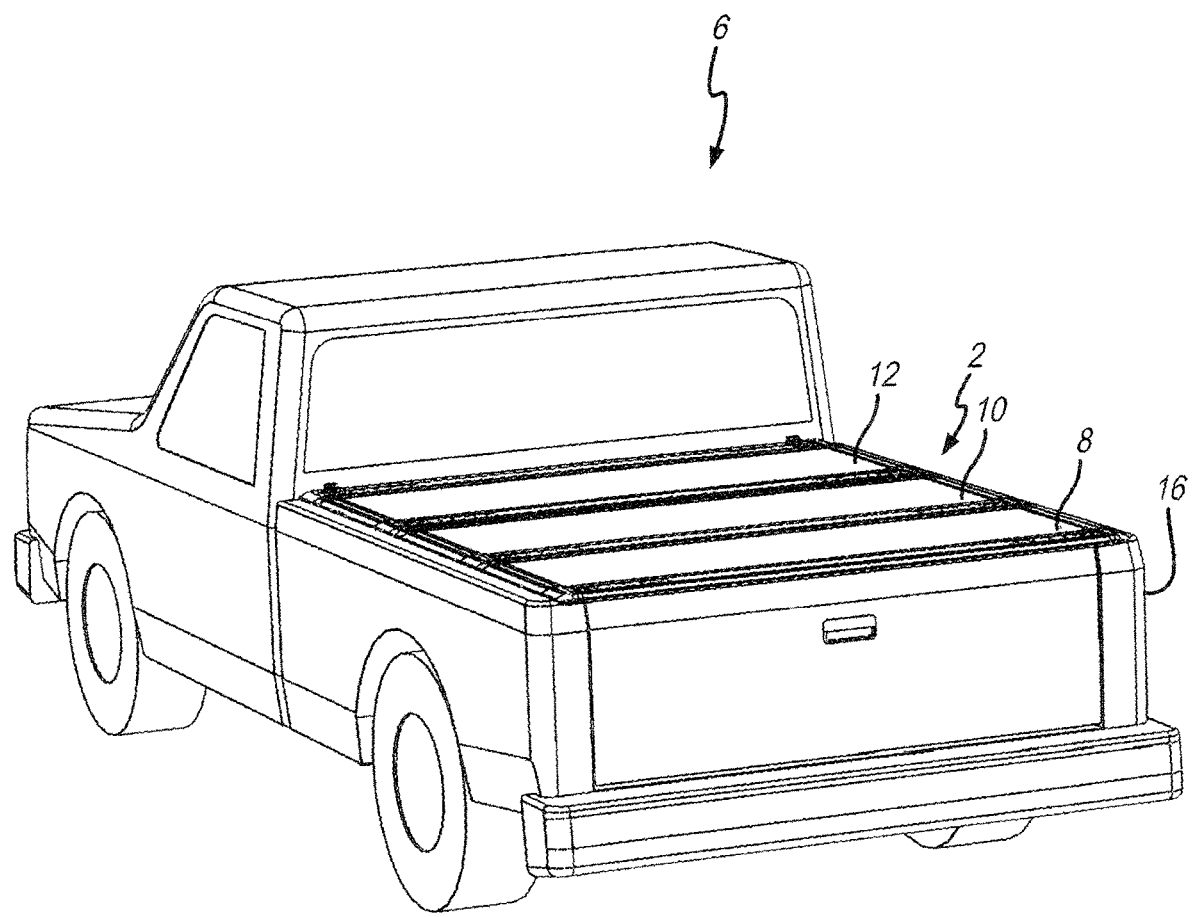
FIGS. 1A, 1B, 1C, and 1D are rear perspective views of a land vehicle having a cab section and a bed section with a tonneau cover located over the bed section, wherein the tonneau cover moves between stowed covering and open positions.
Figure 1B:
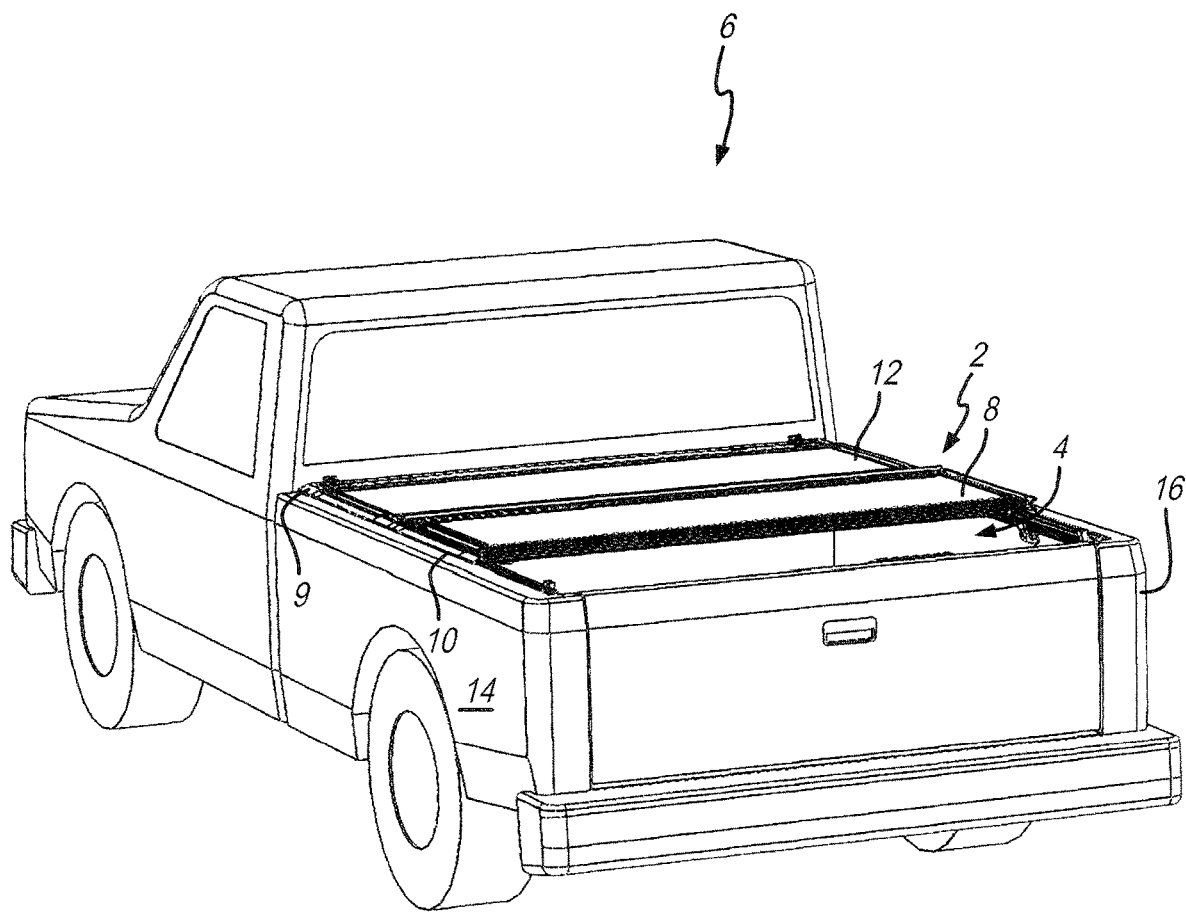

Corresponding reference characters indicate corresponding parts throughout the several views. The exemplification set out herein illustrates embodiments of the tonneau cover tie-down assembly, and such exemplification is not to be construed as limiting the scope of the tonneau cover tie-down assembly in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the tonneau cover, according to the present disclosure, includes a tie-down assembly that assists in securing a section of the tonneau cover onto the sidewalls of the pickup truck bed. It is appreciated that each of the opposing sidewalls of a pickup truck bed will include its own tie-down assembly. It is further appreciated that, although drawings from this disclosure may show embodiments of the tie-down assembly attached to one rail for one sidewall, it is intended to be understood that another tie-down assembly may be configured in the same manner shown, but attached to the opposing sidewall of the pickup truck bed. The tie-down assembly on the rail of the opposing sidewall will couple to another end of the tonneau cover section. An embodiment of the tie-down assembly may also include primary and secondary tie-down assemblies. The primary tie-down assembly will securely couple the tonneau cover section to the rail that is attached to a sidewall of the pickup truck. Likewise, the secondary tie-down assembly will also attach the tonneau cover section to the rail that is attached to a sidewall of the pickup truck. The secondary tie-down assembly is configured such that if the primary tie-down assembly fails, the secondary tie-down assembly will still maintain securement between the tonneau cover section and the rail. It is further understood that the primary and secondary tie-down assemblies by be used in conjunction with each other and exclusive of each other.

An illustrative embodiment of the present disclosure further provides a tie-down assembly that secures base panel 9 of a tonneau cover 2 onto sidewalls 14 and 16 spaced apart from each other and extending from bed 4 as shown in FIGS. 1A, 1B, 1C, 1D, and 1E. Typically, covers such as tonneau cover 2 have a plurality of sections foldable with respect to each other to allow access to bed 4, underneath. As shown in these views, this truck bed cover 2 includes sections 8 and 10 that are both foldable onto section 12 to permit sufficient access to bed 4. Section 12 is foldable with sections 8 and 10 onto base panel 9. Base panel 9 is configured to remain stationary and secure to sidewalls 14 and 16. This allows sections 8, 10, and 12 to be pivotably movable with respect to both the sidewalls 14, 16, and base panel 9.

Truck bed cover 2, shown in these views, illustratively, includes a covering material that covers sections 8, 10, and 12 to shroud bed 4 concealing it underneath. It is appreciated that the covering of truck bed cover 2 may be made from vinyl, fabric, metal, plastic, fiberglass, sail cloth or other like soft or rigid material.

Figure 1C:
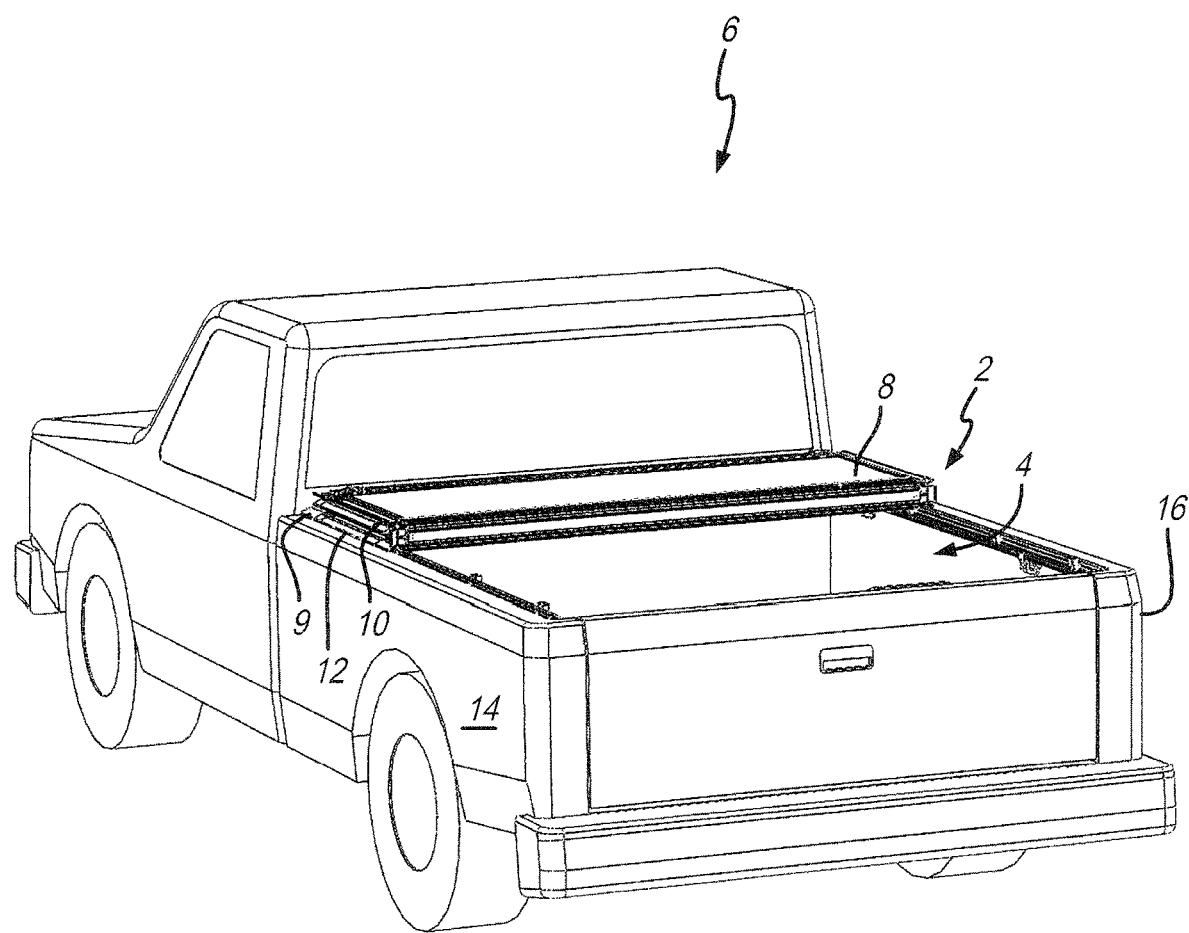
Figure 1D:
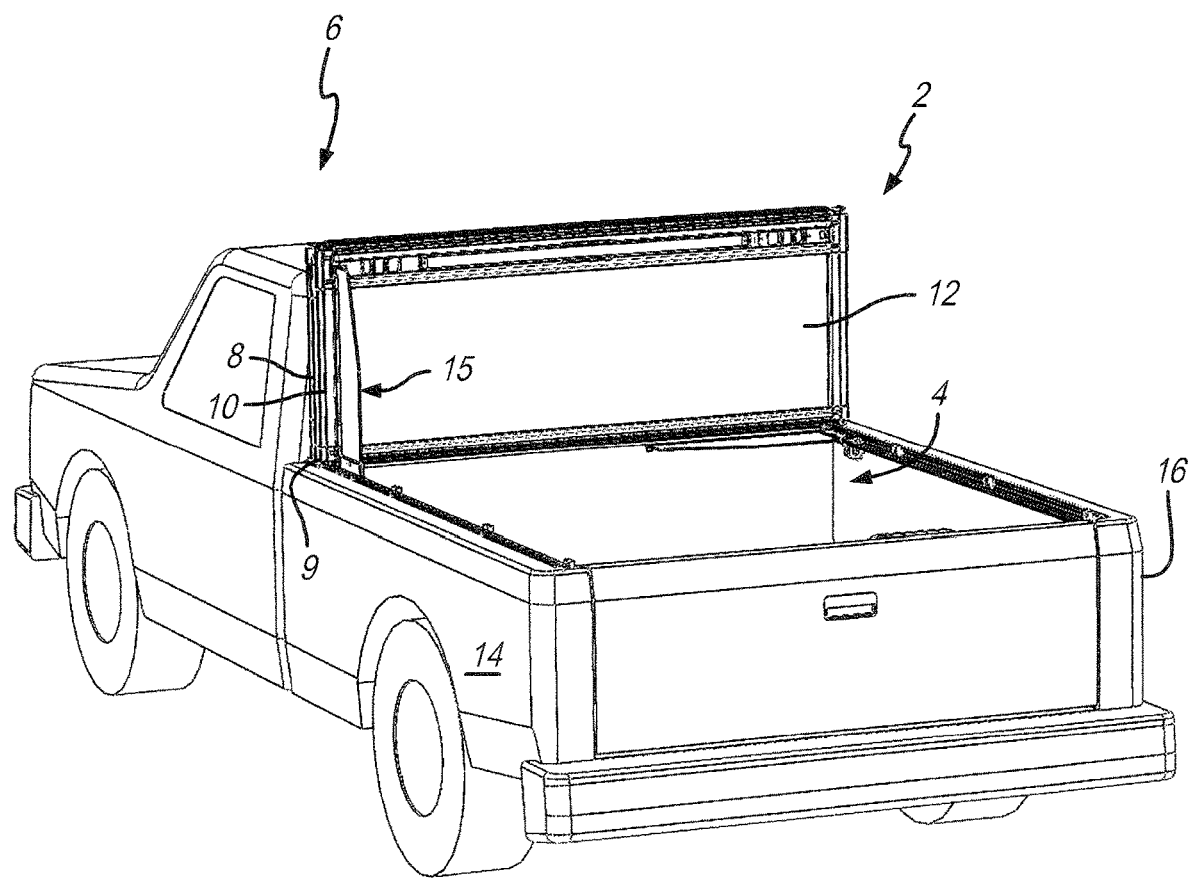
Figure 1E:
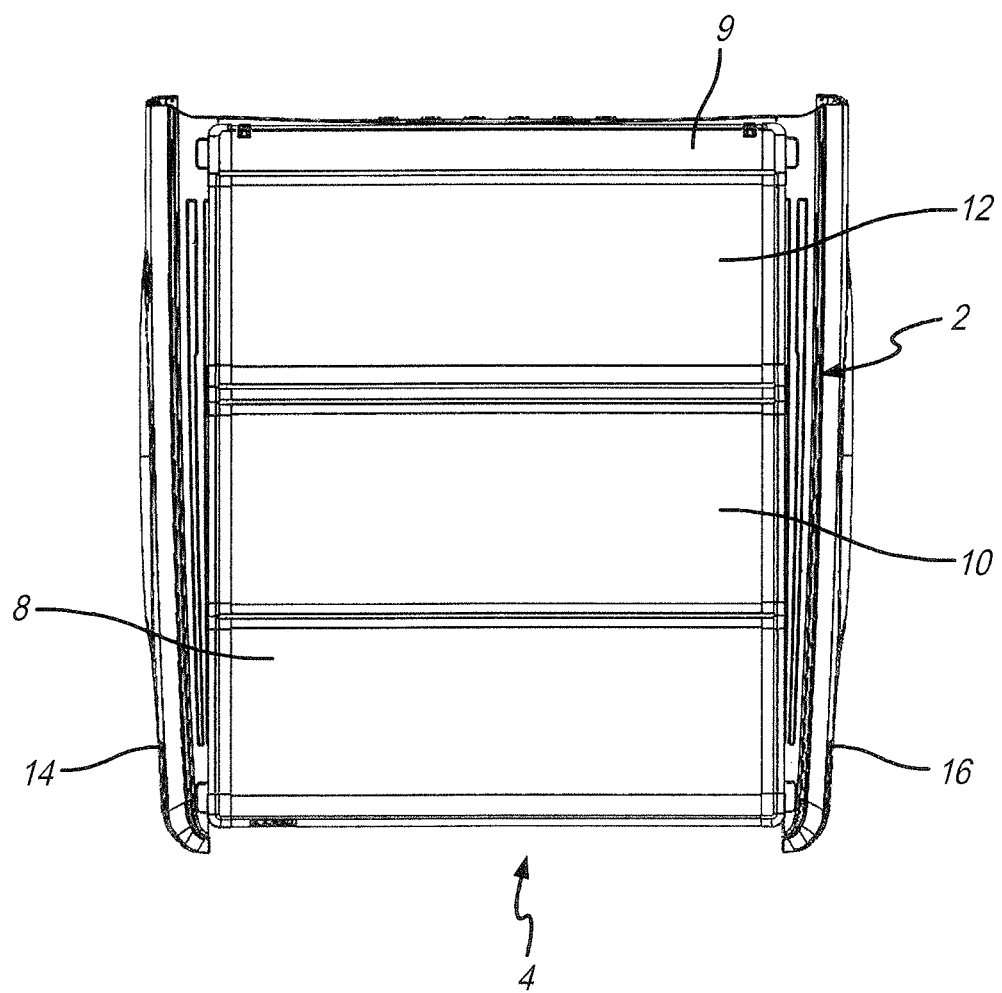
FIG. 1E is a top view of the bed section with the tonneau cover positioned over top.

As shown herein, FIG. 1A depicts truck bed cover 2 completely unfolded and illustratively covering the entire topside of bed 4. The view in FIG. 1B differs in that section 8 of cover 2 has been folded over section 10 to reveal a portion of bed 4. As shown in FIG. 1C, sections 8 and 10 of truck bed cover 2 are folded over to allow access into truck bed 4 of pickup truck 6. Further shown in FIG. 1D, truck bed cover 2 is folded upward on top of base panel 9. Section 12 is supported by gusset 15 to keep truck bed cover 2 in this upward vertical stowed position. The isolated top view of bed 4, with truck bed cover 2 positioned over top, is shown in FIG. 1E. This view also shows the relative positioning of base panel 9 with respect to sections 8, 10, and 12 of truck bed cover 2 and sidewalls 14 and 16. Additional and similar tonneau covers that may employ embodiments of the present disclosure are disclosed in U.S. Patent Application No. 62/577,920, entitled "Folding Cover Attachment Systems," filed on Oct. 27, 2017, and U.S. patent application Ser. No. 15/342,407, entitled "Tonneau Cover," filed on Nov. 3, 2016, the disclosures of which are incorporated expressly herein by reference.

Figure 2:
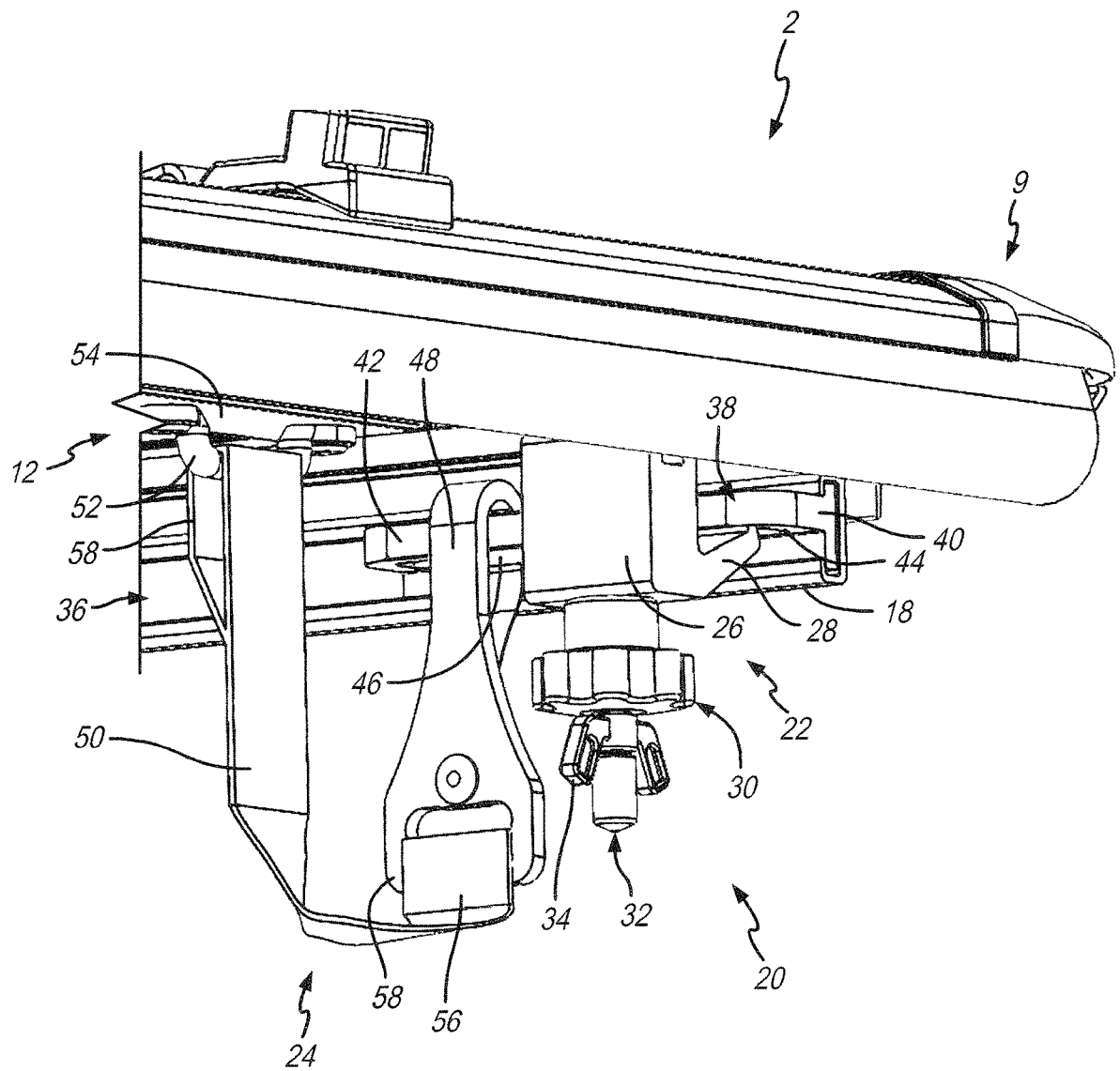
FIG. 2 is a perspective underside detail view of the portion of the tonneau cover showing illustrative embodiments of the tie-down assembly.

A perspective view of a portion of section 12, of truck bed cover 2, with an isolated view of rail 18, is shown in FIG. 2. This view shows tie-down assembly 20 secured to both rail 18 and section 12. Illustratively, tie-down assembly 20 includes a tie-down block assembly 22 and a tie-down tether assembly 24. Tie-down block assembly 22 serves as a primary tie-down mechanism to secure section 12 to rail 18, which, itself, is secured to one of the sidewalls of the pickup truck bed 4. Tie-down tether assembly 24 serves as a secondary tie-down that acts to secure section 12 to rail 18 upon the unlikely event that tie-down block assembly 22 fails. It is appreciated that section 12 may be similar to section 12 shown in U.S. Patent Application No. 62/577,920. Similarly, base panel 9 is similar to base panel 18 shown in U.S. patent application Ser. No. 15/342,407. Both types of cover configurations may employ the tie-down assemblies provided in this disclosure.

With respect to tie-down block assembly 22, it includes a block base 26 that includes a grip member 28. A threaded knob 30 is configured to rotate on a complementarily threaded bolt 32 that engages base panel 9 (see, also, FIG. 3) which attaches base panel 9 to block base 26. An illustrative wing nut 34 is also complementarily threaded onto bolt 32 and configured to thread down and engage threaded knob 30 as illustratively shown herein. Wing nut 34 in this position serves to limit movement of bolt 32 when secured to base panel 9. In other words, when bolt 32 secures base panel 9 to block 26, wing nut 34 is moved down the threads on bolt 32 until it engages threaded knob 30, essentially locking or securing bolt 32 into its position.

Received in channel 36 of rail 18 is an illustrative tie-down base 38. Particularly, a tongue 40 extends from tie-down base 38 and fits into channel 36 of rail 18 as illustratively shown. Extending from tongue 40 is base 42 which includes through bores 44 and 46 (see, also, FIG. 3). Through bore 44 receives grip member 28 extending from block base 26 of tie-down block assembly 22. Through bore 46 receives hook member 48 of tie-down tether assembly 24. A strap 50 is attached to hook member 48, as well as a bracket 52, that is secured onto frame portion 54 of section 12. It is appreciated that strap 50 may be made of a fabric. Alternatively, strap 50 may be made of a variety of materials in a variety of configurations, including but not limited to, vinyl, metal, plastic, woven high strength material, etc., all of which are contemplated within the scope of this disclosure. Additionally, the shown configuration of strap 50 has a first loop 56 extended around hook base 58 as an illustrative means of connection. It is contemplated within the scope of this disclosure that alternative means to strap 50 and hook member 48 including employing a fastener, adhesive, gripping member, etc., may be employed. Similarly, strap 50, having a second loop 58 shown extended around bracket 52, is likewise illustrative. Second loop 58 may be attached to bracket 52 via other alternative means like that described with respect to first loop 56 and hook member 48. Further, bracket 52 may have alternative configurations, including a fastener, gripping members, or a hook (like that of hook member 48), for example.

As can be appreciated in this view, tie-down block assembly 22 of tie-down assembly 20 is the primary means for securing base panel 9 to rail 18, which itself attaches to a sidewall of the pickup truck. If for some reason tie-down block assembly 22 fails to maintain attachment between base panel 9 and rail 18, tie-down tether assembly 24 is available to maintain the securement between base panel 9, and rail 18 as a secondary or backup means of securing the two structures together.

Figure 3:
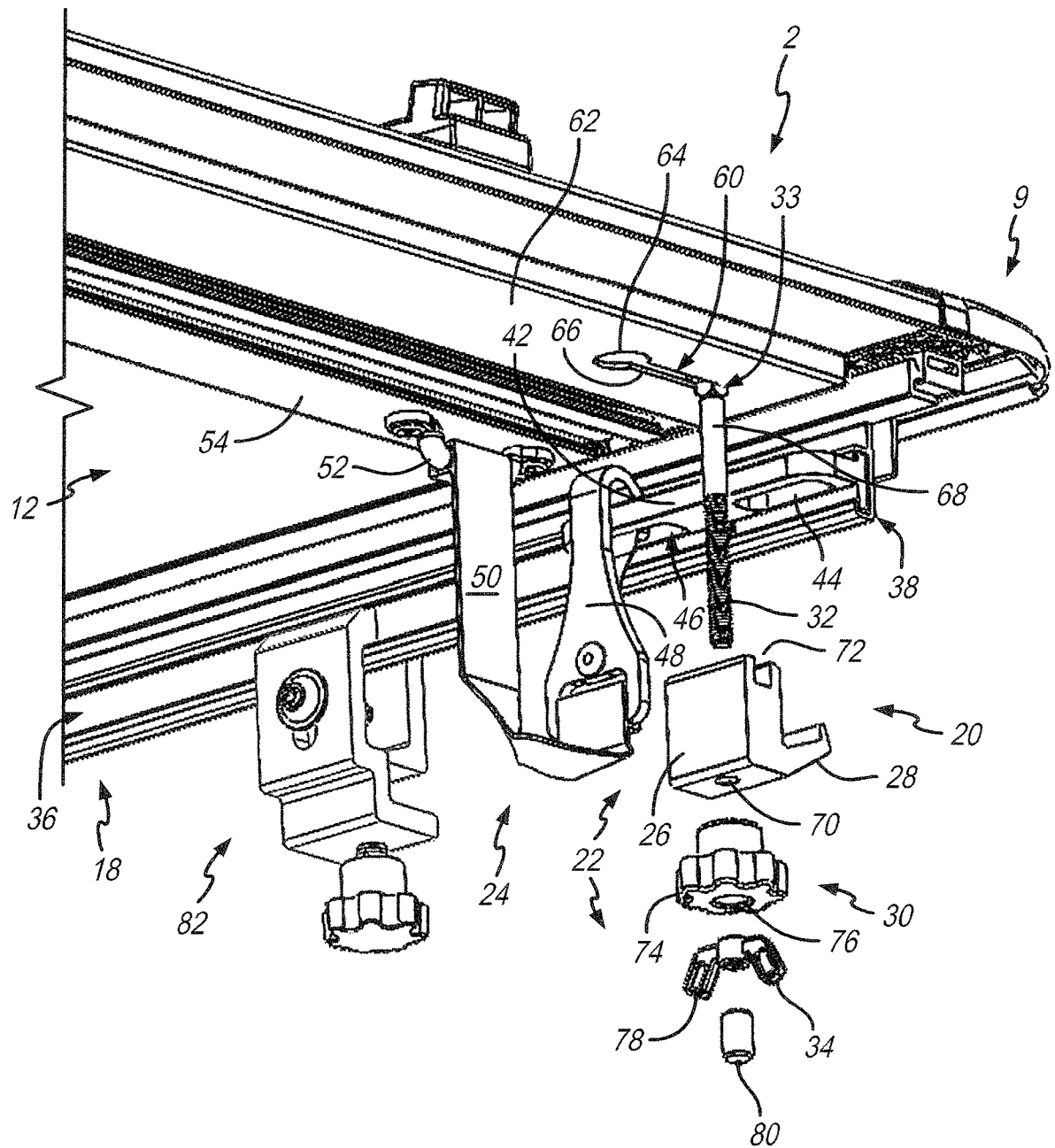
FIG. 3 is a perspective underside upward-looking detail view of a portion of the tonneau cover showing a partially exploded view of a portion of the tie-down assembly.

Another perspective view of a portion of section 12 and base panel 9 of tonneau cover 2, is shown in FIG. 3, except, including an exploded view of tie-down assembly 20. This view shows bolt 32 having a bolt head 33 fitted into slot 60 formed in frame portion 62 of base panel 9. It is appreciated that slot 60 includes a wide opening portion 64 and adjacent narrow channel portion 66, which are in communication with each other to accommodate bolt 32. The purpose of wide opening portion 64 is to receive bolt head 33, which is configured to have a wider cross-sectional diameter than shaft portion 68 of bolt 32. Bolt head 33 is able to fit into slot 60 by entering wide opening portion 64. Once this occurs, shaft portion 68 may fit into the narrow channel portion of slot 60. This means that when in this position in narrow channel portion 66, bolt 32 cannot be removed from slot 60. Accordingly, when attached to the other structures of tie-down assembly 20 and engaged to tie-down base 38, bolt 32 holds base panel 9 down adjacent rail 18.

With respect to the additional structures of tie-down assembly 20, tie-down block 22 is shown with grip member 28 extending therefrom, bore 70 disposed through block base 26, and channel 72 extending along the top edge of block base 26. Channel 72 is configured to have a proper height so that it presses against the bottom of frame 62 when the grip member is fully engaged. This prevents over tightening the tie down and damaging components. Threaded knob 30 includes a grip portion 74, as well as threaded bore 76. Grip portion 74 allows an operator to rotate along corresponding threads on bolt 32 in order to tighten or loosen block base 26 to or from framing portion 62 of base panel 9. Wingnut 34 also includes a threaded bore 78 that rotates along corresponding threads on bolt 32. Wingnut 34 is able to abut threaded knob 30 (see, also, FIG. 2) in order to create a locking feature for tie-down block assembly 22 having two separate threaded members on bolt 32. This configuration serves to inhibit threaded knob 30 from moving while sandwiched between block base 26 and wingnut 34. Optionally, cap 80 may be placed over the threaded end of bolt 32 adjacent wingnut 34 to protect the expressed threads.

This view of FIG. 3 also shows tie-down tether assembly 24 with its hook member 48 engaged with through bore 46 of base 42 of tie-down base 38 fitted in rail 18. Also shown on the other end of strap 50 is its attachment to bracket 52 which is attached to frame portion 54 on section 12. Further shown in this view is clamp assembly 82 which illustratively engages channel 36 of rail 18 to attach same to either sidewall 14 or 16 as needed for installation of tonneau cover 2.

Figure 4:
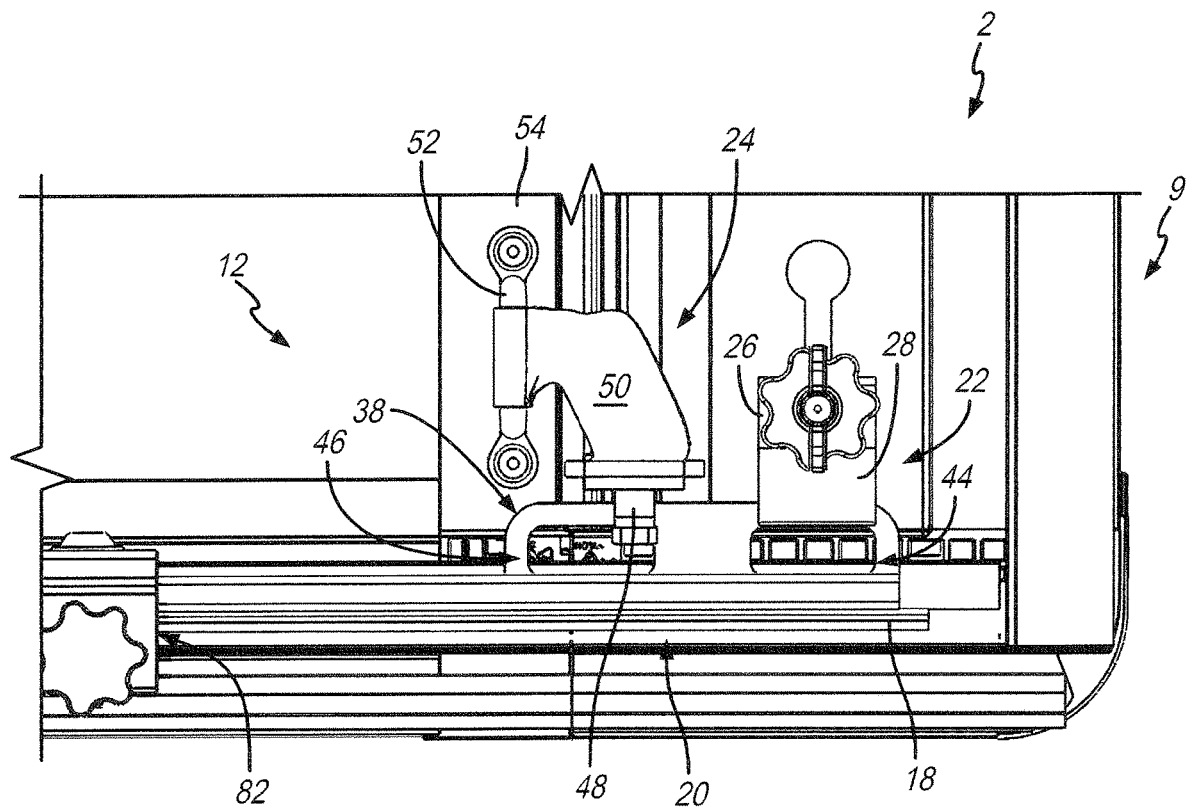
FIG. 4 is an underside upward-looking detail view of a portion of the tonneau cover showing the tie-down assembly.

An underside upward looking view of section 12 and base panel 9 of tonneau cover 2 is shown in FIG. 4. With regard to tie-down assembly 20, tie-down block assembly 22 is shown securing base panel 9 to rail 18, which itself is to be attached to a sidewall of the truck bed. Tie-down tether assembly 24 is likewise attached to both base panel 9 and rail 18 as a safety back-up to tie-down block assembly 22. This view further shows the relative positioning of tie-down block assembly 22 and tie-down tether assembly 24 with respect to each other and to tie-down base 38 on rail 18. As shown, with respect to tie-down block assembly 22, this view shows grip member 28 engaged with tie-down base 38 at bore 44. This view further assists demonstrating how block base 26 serves as a hooking structure between base panel 9 and tie-down base 38. Similarly, this view further illustrates how hook member 48 of tie-down tether assembly 24 likewise engages tie-down base 38 at bore 46. Employing strap 50 coupled to bracket 52 attached to frame portion 54 ensures that, in the unlikely event of a failure of tie-down block assembly 22 to hold base panel 9 onto rail 18, tie-down tether assembly 24 will provide such securement. In the illustrative embodiment, tie-down tether assembly includes some slack. This is because frame 54 of section 12 can pivot with respect to base panel 9. This slack allows section 12 to maintain this movement. Also shown in this view is clamp assembly 82 which holds rail 18 to one of the side walls of truck 6 (see, also, FIGS. 1A-1C).

Figure 5:
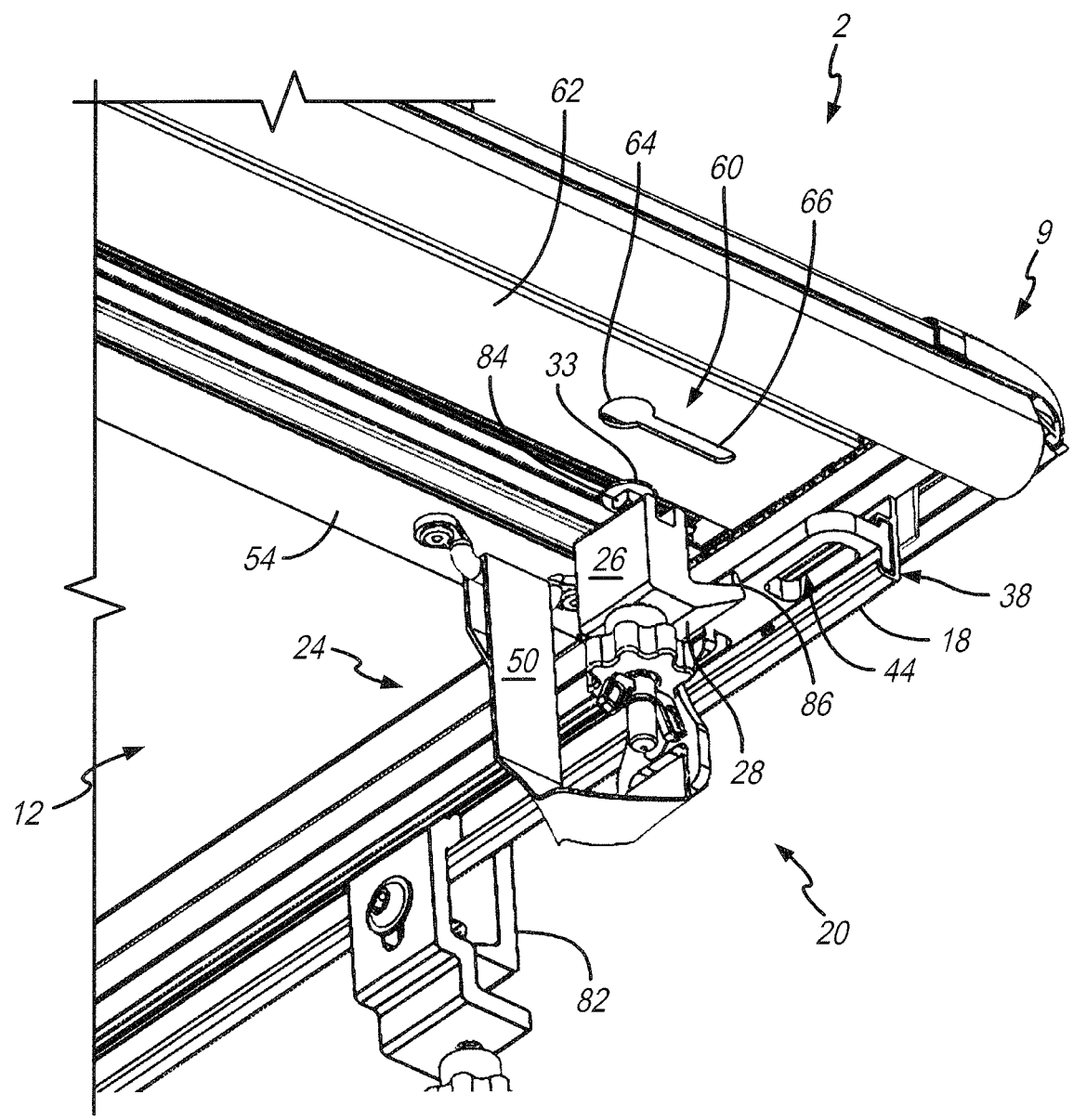
FIG. 5 is an underside perspective upward-looking detail view of the tonneau cover showing the tie-down block assembly and the tie-down tether assembly, wherein the tie-down block assembly is separated from the tonneau cover.
Figure 6:
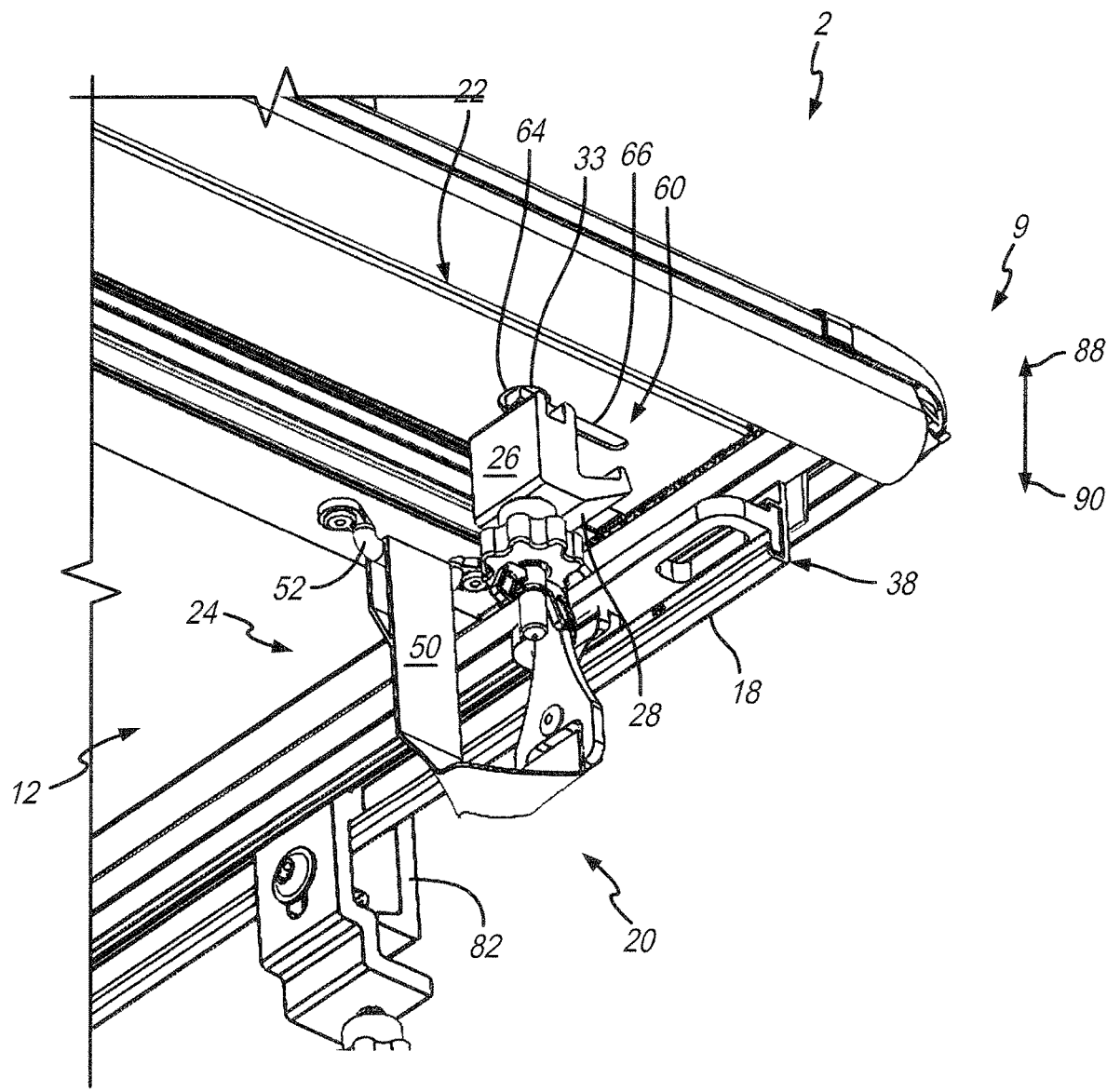
FIG. 6 is another underside perspective upward-looking detail view of the tonneau cover showing the tie-down block assembly engaging the base panel of the tonneau cover.
Figure 7:
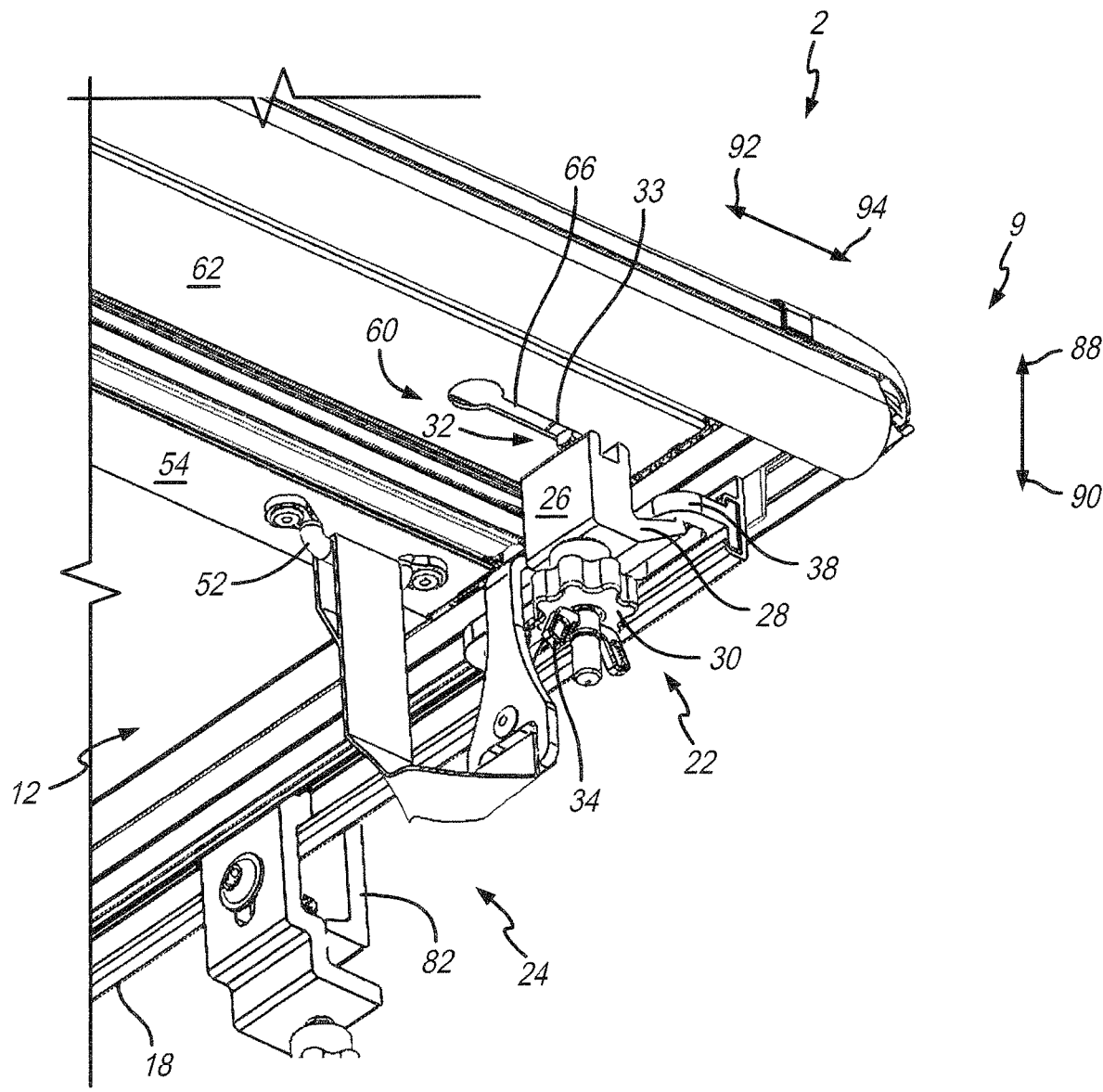
FIG. 7 is another underside perspective upward-looking detail view of the tonneau cover showing the tie-down block assembly engaged to both the underside of the base panel and a bracket on a rail, and the tide-down tether assembly attached to the bracket on the rail and a cover section.

Perspective views of a portion of section 12 and base panel 9 of tonneau cover 2 are shown in FIGS. 5, 6, and 7. These views demonstrate how tie-down block assembly 22 secures to both base panel 9 and to tie-down base 38 to secure base panel 9 to rail 18. As shown in FIG. 5, tie-down block assembly 22 is positioned separate from both frame portion 62 and tie-down base 38. This view further depicts bolt head 33 extending from block base 26. In particular, this view shows a squared collar 84 located adjacent bolt head 33. Squared collar 84 is square-shaped as illustratively shown to prevent bolt 32 from rotating while located in narrow channel portion 66 of slot 60. It will be appreciated by the skilled artisan upon reading this disclosure that such a bolt 32, with bolt head 33 and squared collar 84, may be the conventional configuration of a shoulder bolt. It is further appreciated that such bolts, or custom-made fasteners, can be used to help secure base panel 9 to rail 18 and such are within the scope of the present disclosure.

This view further shows grip member 28 separated from tie-down base 38. It is appreciated that grip member 28 may include a hook-type structure 86 or the like in order to secure to tie-down base 38. Through bore 44 is positioned as such in tie-down base 38 to allow hook-type structures to selectively engage tie-down base 38. At this point, tie-down tether assembly 24 may or may not already be secured to both frame portion 54 and tie-down base 38. If such connection is made, strap 50 may provide enough slack to allow tie-down block assembly 22 to secure to both tie-down base 38 and frame portion 62.

The next step of the installation process is shown in the perspective view of section 12 and base panel 9 in FIG. 6. Here, bolt head 33 is inserted into wide opening portion 64 of slot 60. Grip member 28 of block base 26 is still separated from tie-down base 38. It is appreciated that bolt head 33 is moved in direction 88 to insert into wide opening portion 64. To remove tie-down block assembly 22 from slot 60, bolt head 33 must be positioned at wide opening portion 64 and moved downward in direction 90. In this view, tie-down tether assembly 24 is attached to tie-down base 38 and bracket 52. Clamp assembly 82 is also shown engaged with rail 18.

Completing securement of tie-down block assembly 22 to base panel 9 is shown in the perspective view of section 12 and base panel 9 in FIG. 7. Here, tie-down block assembly 22 is moved in both directions 94 and 88 to secure base panel 9 onto rail 18. In particular, block base 26 is moved in direction 94 so that bolt head 33 of bolt 32 is fitted into narrow channel portion 66 of slot 60. Because bolt head 33 is illustratively wider than narrow channel portion 66, bolt 32 cannot be removed from frame portion 62 by moving bolt 32 in direction 90. Block base 26 would have to be moved back in direction 92 until bolt head 33 aligns again with wide opening portion 64 (see, also, FIG. 6) before bolt 32 can be removed from frame portion 62. Accordingly, grip member 28 on block base 26 is moved in both directions 94 and 88 (as compared to the view shown in FIG. 6) in order for grip member 28 to engage tie-down base 38 as shown. This engagement between tie-down base 38 and grip member 28 prevents block base 26 from being movable in direction 92. This is aided by threaded knob 30 being threaded down bolt 32 in direction 88, which may simultaneously push block base 26 in direction 88 while pulling bolt 32 in direction 90. This creates securement of base panel 9 against rail 18.

Wingnut 34, as previously discussed, may also be threaded down bolt 32 until engaged with threaded knob 30 to create a locking feature that prevents unintentional movement of block base 26 in either directions 90 or 92, which may serve to extricate tie-down block assembly 22 from both frame 62 of base panel 9 and tie-down base 38 of rail 18. In this configuration, tie-down block assembly 22 secures base panel 9 to rail 18. It is further appreciated in this view that tie-down tether assembly 24 serves as a backup being both secured to tie-down base 38 on rail 18 and bracket 52 of frame portion 54 to serve as a backup to maintain securement between base panel 9 and rail 18 if tie-down block assembly 22 for some reason no longer secures base panel 9 to rail 18. Like the other views, clamp assembly 82 shown herein holds rail 18 to one of the sidewalls 14 or 16 of bed 4.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent application differs from the priority Application, the disclosure from this non-provisional patent application controls.

What is claimed is:

1. A tonneau cover assembly that selectively covers a cargo bed of a truck, the tonneau cover assembly comprising:
    a panel configured to extend over the cargo bed of the truck;
    at least one cover section located adjacent the panel;
    at least one rail;
    a first bracket located on the at least one rail;
    a tie-down block assembly which includes:
        a block having a first surface and an arm that extends from the block and is spaced apart from the first surface;
        wherein the arm includes a second surface;
        wherein the first surface is spaced apart from the second surface; and a bolt that includes a bolthead and a shaft extending from the bolthead wherein the bolthead is wider than a diameter of the shaft;

wherein the bolthead of the bolt is fitted in an opening in the panel;

wherein the shaft of the bolt is disposed in the block;

wherein the first surface of the block abuts a surface of the panel; and wherein the second surface of the arm that extends from the block abuts the first bracket located on the at least one rail; and a tether assembly which includes:
   a hook that is selectively engageable with the first bracket located on the at least one rail;
   a second bracket attached to the at least one cover section; and
   a strap that is attached to the hook and the second bracket.

2. The tonneau cover assembly of claim 1, wherein the first bracket includes first and second openings wherein the first opening receives a portion of the arm and the second opening receives a portion of the hook.

3. The tonneau cover assembly of claim 1, further comprising a threaded knob that engages threads on the shaft of the bolt and engages the block of the tie-down block assembly to press the first surface of the block against the surface of the panel.

4. The tonneau cover assembly of claim 1, wherein the shaft of the bolt is disposed through the block.

5. The tonneau cover assembly of claim 1, wherein the surface of the panel is an underside surface.

6. The tonneau cover assembly of claim 1, wherein the strap is made of a flexible material.

7. A tonneau cover assembly that selectively covers a cargo bed of a truck, the tonneau cover assembly comprising:

a panel configured to extend over the cargo bed of the truck;

at least one rail; and a tie-down block assembly which includes:
   a block having a first surface and an arm that extends from the block and is spaced apart from the first surface;
   wherein the arm includes a second surface;
   wherein the first surface is spaced apart from the second surface; and
   a bolt that includes a bolthead and a shaft extending from the bolthead wherein the bolthead is wider than a diameter of the shaft;
   wherein the bolthead of the bolt is fitted in an opening in the panel;
   wherein the shaft of the bolt is disposed in the block;
   wherein the first surface of the block abuts a surface of the panel; and
   wherein the second surface of the arm that extends from the block abuts a portion of the at least one rail.

8. A tonneau cover assembly that selectively covers a cargo bed of a truck, the tonneau cover assembly comprising:

a panel configured to extend over the cargo bed of the truck;

at least one cover section located adjacent the panel;

wherein the at least one cover section includes at least one frame member;

at least one rail;

a first bracket located on the at least one rail; and a tether assembly which includes:
   a hook that is selectively engageable with the first bracket located on the at least one rail;
   a second bracket attached to the at least one frame member of the at least one cover section; and
   a strap that is attached to the hook and the second bracket.

9. A tonneau cover assembly that selectively covers a cargo bed of a truck, the tonneau cover assembly comprising:

a panel configured to extend over the cargo bed of the truck;

at least one rail; and a tie-down assembly which includes:
   a head that engages the panel;
   a first surface that is spaced apart from the head that engages a bottom surface of the panel; and
   a second surface that is spaced apart from the first surface and the head;
   wherein the second surface engages a portion of the at least one rail.

10. The tonneau cover assembly of claim 9, wherein the head fits into a slot formed in the bottom surface of the panel.

11. The tonneau cover assembly of claim 9, wherein the bottom surface of the panel is located between the head and the first surface of the tie-down assembly.

12. A tonneau cover assembly that selectively covers a cargo bed of a truck, the tonneau cover assembly comprising:

a panel configured to extend over the cargo bed of the truck;

at least one cover section located adjacent the panel;

wherein the at least one cover section includes at least one frame member;

at least one rail;

wherein the at least one rail is secured to the cargo box and does not fold; and a tether assembly which includes a longitudinally extending strap that extends from the at least one rail to the at least one frame member of the at least one cover section.

13. The tonneau cover assembly of claim 12, further comprising a hook attached to a first end of the strap, wherein the hook engages a portion of the at least one rail.

14. The tonneau cover assembly of claim 12, further comprising a bracket that is attached to the at least one frame member of the at least one cover section and attached to a second end of the strap.

15. The tonneau cover assembly of claim 12, wherein the longitudinally extending strap has a length that creates slack between the at least one rail and the at least one cover section.

16. The tonneau cover assembly of claim 12, wherein the longitudinally extending strap is made of a flexible material.

* * * * *